May 21, 1968  P. R. KERR ET AL  3,384,529
SHELL MOULDING
Filed Sept. 22, 1965  5 Sheets-Sheet 4
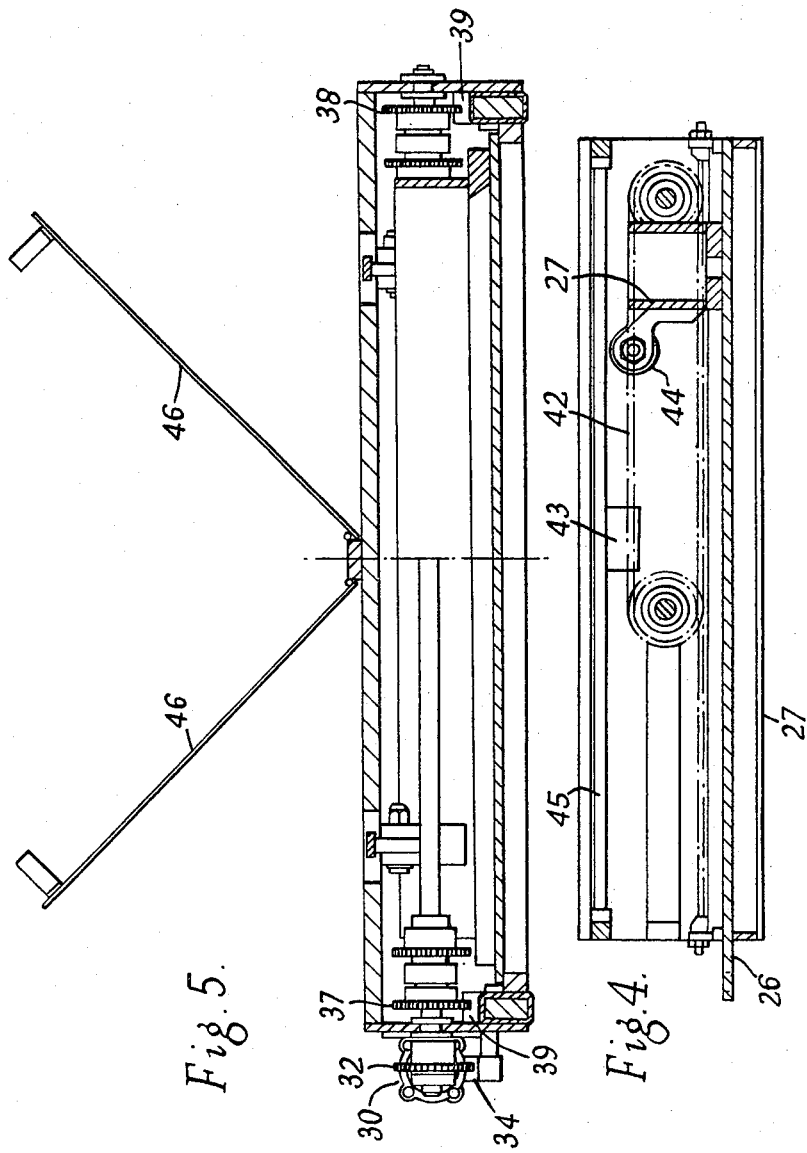
INVENTORS
Peter Reid Kerr
Max Alderson
BY
Watson, Cole, Grindle + Watson
ATTORNEYS

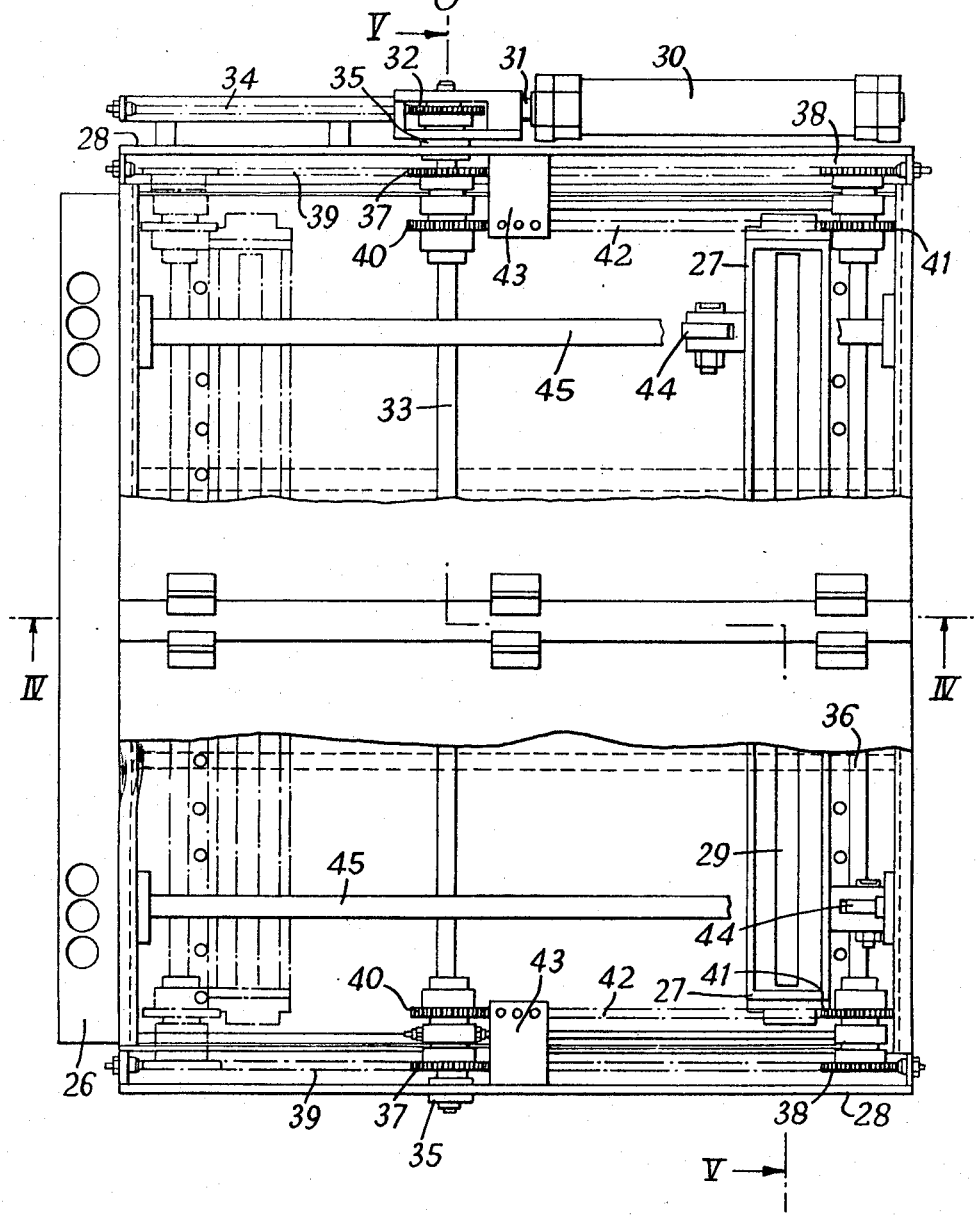

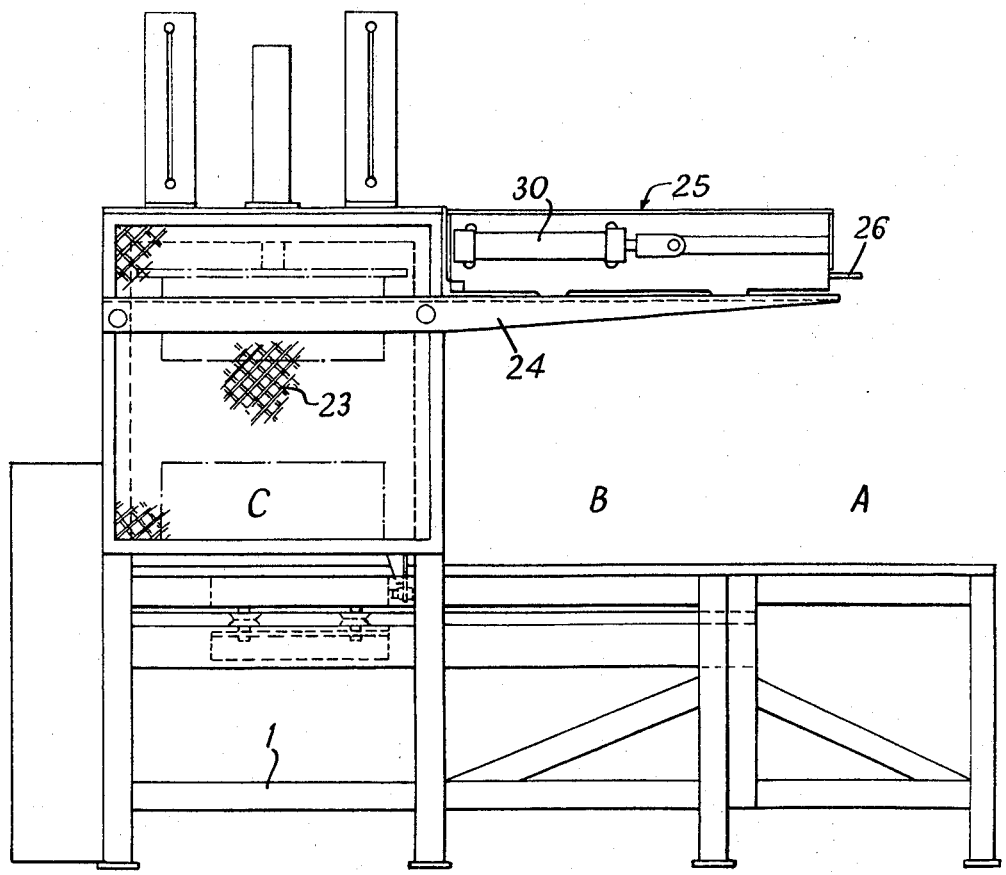

' # United States Patent Office 3,384,529
Patented May 21, 1968

3,384,529
SHELL MOULDING
Peter Reid Kerr, Surrey, and Max Alderson, Derbyshire, England, assignors to Keramatic Engineering Company Limited, Kingston-upon-Thames, England, a British company
Filed Sept. 22, 1965, Ser. No. 489,170
Claims priority, application Great Britain, Sept. 22, 1964, 38,664/64
10 Claims. (Cl. 156—556)

ABSTRACT OF THE DISCLOSURE

Apparatus for applying adhesive to one component and subsequently clamping it to another component comprises a resilient loading platform movable horizontally and linearly from a loading station to a clamping station; adhesive applying means are mounted above the path of travel of the loading platform and comprise an apertured plate across which an opened-bottomed trough containing adhesive is adapted to be moved in such a manner that each end of the trough is guided and driven across the plate; the component to which adhesive is to be applied is mounted on the loading platform and beneath the adhesive applying means, whereupon the trough is moved across the plate to allow adhesive to fall through the apertures in the plate and onto the component, the other component is then located in register with the first and the two components still on the loading platform are moved to a clamping station where they are clamped together between the loading platform and resilient clamping means.

---

This invention relates to shell moulding and is concerned with apparatus for assembling resinated sand shells to form shell moulds. For shell moulding, two resinated sand shells are secured together to define a mould casting. Generally one shell is laid on a table and adhesive is applied to it, whereafter the other shell is positioned on the first and the two shells, are then clamped together until the adhesive has set. The application of the adhesive is a time-consuming operation especially when complex shapes are involved.

According to the present invention there is provided apparatus for assembling resinated sand shells to form shell moulds, comprising a resilient loading platform for receiving shells to be assembled, resilient clamping means, means for applying adhesive to a shell on said loading platform, the loading platform being movable from a position below said adhesive applying means to a position below said clamping means, and means for moving said clamping means into engagement with a shell mould on the loading platform; said adhesive applying means comprising an apertured plate mounted above a location for the reception of a shell on said loading platform, the apertures in the plate corresponding to positions in the shell where the adhesive is to be applied, an open-bottomed trough adapted to receive adhesive and movable over the plate so that adhesive can pass through the apertures in the plate and fall to the shell therebelow, and means for moving said trough across said plate. In order to minimize the effects of static electricity, it is highly desirable that the apertured plate should be made of metal or other electrically conducting material and should be earthed by good electrical contact with a frame of the apparatus. In the operation of the apparatus, a shell moulding half is placed on the loading platform which is positioned below the aforesaid adhesive applying means, and adhesive is applied to the shell, whereupon a second shell is placed on the first to define the shell mould cavity or cavities, the second shell being in register with the first. The loading platform is then moved into the apparatus beneath the clamping means which then descend for the requisite time to clamp the two shells together. The clamping means then rise and the loading platform moves out of the apparatus so that the completed shell mould can be removed therefrom.

Both the clamping means and loading platform are preferably made resilient by forming them of a plurality of spring pins which may be made individually adjustable as to height.

In order to enable the invention to be more readily understood, reference will now be made to the accompanying drawings, which illustrate diagrammatically and by way of example two embodiments thereof, and in which:

FIG. 3 is a part cut away plan view of an adhesive applying device of the apparatus.

FIG. 4 is a section on the line IV—IV in FIG. 3.

FIG. 5 is a section on the line V—V in FIG. 3, and

FIG. 6 is a side view of a modification of the apparatus shown in FIG. 1.

Figure 1:
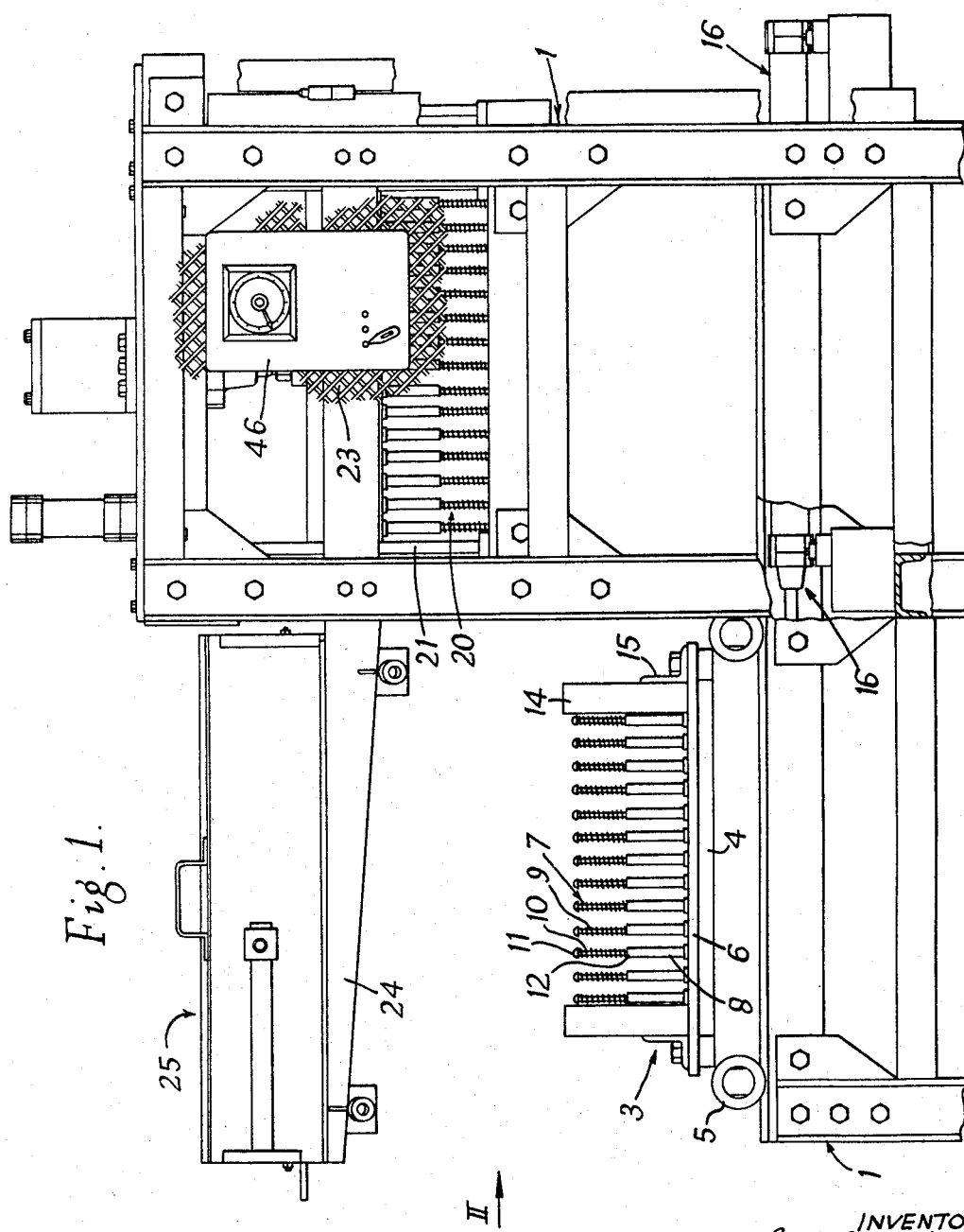
FIG. 1 is a side view of apparatus for assembling shell moulds.
Figure 2:
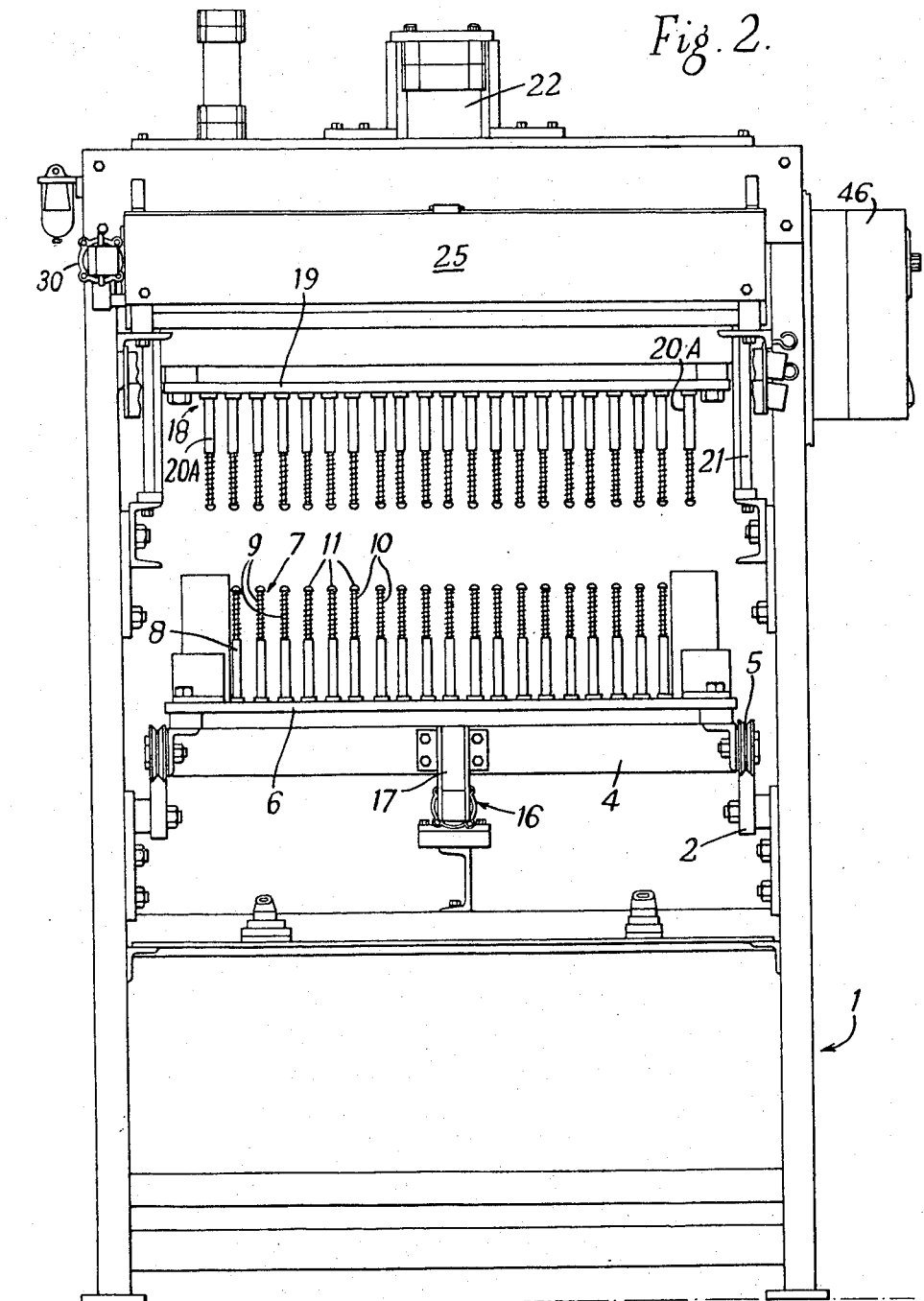
FIG. 2 is an end view of the apparatus taken in the direction of the arrow II in FIG. 1.

Referring now to FIGS. 1 and 2 of the drawings, there is shown apparatus for applying adhesive to and clamping together shell mould halves comprising a main frame which is formed from girders and which is substantially L-shaped in side view as is clear from FIG. 1. Across the top of the foot of the L and into the frame extend rails 2 on which a loading platform 3 is movable from a loading position on the foot of the L, to a clamping position within the frame. The loading platform 3 comprises a trolley 4 having self-cleaning V wheels 5 running on the rails, and the base of the trolley comprises a plate 6 formed with a number of holes in each of which is mounted an upstanding spring pin 7. Each pin comprises a hollow cylindrical base portion 8 and an upper, headed, pin portion 9 of smaller diameter than the base portion. A spring 10 surrounds the pin portion and bears at one end against the head 11 of the pin and at the other end against a shoulder 12 on the base portion. The head portions 9 can be pushed towards the base portions 8 against the actions of the springs 10 until the ends of the pin portions remote from the heads engage abutments or shoulders within the base portions, the pin portions not being fully retractable into the base portions. If desired, enclosed spring pins may be employed in which the spring is within the interior of the pin, and the pins may be made adjustable for height if desired.

An end plate 14 is mounted at each end of the trolley 4 by means of brackets 15, the end plates 14 extending slightly higher than the spring pins 7. The trolley is movable from the loading position shown in FIG. 1 into a clamping position by means of a pneumatic cylinder and piston arrangement 16 which is mounted below the trolley and the piston of which engages with a lug 17 depending from the rear end of the trolley bracket, relative to the direction of travel of the trolley from the loading position to the clamping position.

Mounted within the leg of the L-shaped frame is a clamping table 18 comprising a base plate 19 from which depend a plurality of spring pins 20 of the same construction as those just described. The clamping table has grooved guide blocks (not visible) engaging vertical rails 21 within the frame, and is movable up and down the vertical rails by means of a second pneumatic piston and cylinder arrangement 22 so that the end pins 20A of the clamping table can engage with the end plates 14 on the loading trolley. The apparatus is provided with a wire guard 23, part of which is indicated in FIG. 1.

Attached to the frame and cantilevered therefrom at a location above the loading station on brackets 24 is a device 25 for applying an adhesive to a shell mould half located at the loading station. The adhesive applying device is shown in greater detail in FIGS. 3 to 5 of the drawings and essentially comprises an apertured plate 26 and an open-bottomed trough 27 movable over the plate. The plate is apertured in the locations at which it is desired to deposit adhesive on a shell on the loading platform, and the plate is made removable, so that an appropriate plate can be chosen for any series of shells. Since the positions of the apertures in the plate depend upon the shape of a shell to be treated, it is felt that no useful purpose is served by showing any particular disposition of apertures and these positions are therefore omitted from the drawings.

The adhesive applying device includes an open box-like housing 28 into which the apertured plate 26 is slidable through a slot in the end of the housing remote from its points of attachment to the main frame 1. The trough 27 which is movable over the plate 26 has closed sides and is open-bottomed by virtue of a slot 29 extending along the bottom of the trough. Alternatively, the bottom of the trough could be formed with appropriately positioned apertures. A pneumatically operable cylinder 30 is mounted on the housing 28 adjacent and along one side thereof. The cylinder has a piston, on the rod 31 of which is mounted a sprocket 32 with its axis normal to the axis of the piston rod 31. The sprocket 32 is fixedly mounted on a cross-shaft 33 extending across the apertured plate from one side thereof to the other. The sprocket 32 runs on an external rack 34 so as to translate linear motion of the piston rod into rotary motion of the cross-shaft 33 which has sliding bearings 35 to ensure engagement of the sprocket 32 with the rack 34. A second cross-shaft 36 is spaced from the cross-shaft 33, the second cross-shaft being near one end of the apertured plate when the first-mentioned cross-shaft is at about the middle thereof. The second cross-shaft may also run in sliding bearings. A sprocket 37 is fixedly mounted on each end of the cross-shaft 33 and a sprocket 38 is fixedly mounted on each end of the cross-shaft 36, the sprockets 37 and 38 running on racks 39 located on each side of the plate 26. Between the sprockets 37 and adjacent the latter, the cross-shaft 33 carries two further sprockets 40 rotatably mounted on the cross-shaft 33. In a similar manner, the cross-shaft 36 carries two further sprockets 41 which are rotatably mounted on the cross-shaft 36. Two endless chains 42, one on each side of the device, connect the sprockets 40 and 41. One part of each chain is secured within a respective anchor bracket 43 mounted on the side of the housing 28, while another part is fixed to the trough 27, the arrangement being such that one unit of linear travel of the piston rod 31 is converted into two units of linear travel of the trough, while the trough is kept square to the direction of traverse, since it is, in effect, driven at each end thereof. The trough is fitted with rollers 44, which run on steady bars 45 mounted above the plate and trough and which serve to maintain the trough in contact with the plate, the rollers being mounted on eccentric spindles to compensate for plate thickness and wear. Furthermore, drain troughs are provided at each end of the traverse of the trough for excess adhesive and covers 46 are provided for the housing.

In the operation of the apparatus just described, a resinated sand shell which defines one half of a shell moulding cavity is laid with its intended outside downwards on the spring pins 7 of the loading platform. When the shell is correctly positioned on the loading platform, the trough 27 of the adhesive applying device, which trough is filled with adhesive to be applied, is traversed across the apertured plate 26 from the full line position shown in FIG. 3 to the broken line position, whereby drops of adhesive are passed through the apertures in the plate and fall in the correct positions on to the shell below. An operator then places a further shell moulding half on the loading platform so that the two shell mould halves define a shell moulding cavity, the shell mould halves being in register with one another. The loading platform is then traversed into the clamping position so that it lies below the clamping table, whereupon the clamping table descends to clamp the two shell halves together for a period of time sufficient to allow the adhesive to set. After the requisite time which is controlled by a timing device 46, the clamping table is raised and the loading platform is traversed back to the loading position where the completed shell moulding is unloaded by the operator who then places another shell mould half in position, whereupon the cycle is repeated, the trough of the adhesive applying device now being traversed in the other direction, i.e. from the broken line position to the full line position in FIG. 3.

It is to be appreciated that the apparatus just described may be made fully automatic by providing appropriate switches in a manner well understood in the art and therefore not needing detailed description so that when the first half shell is in position, the adhesive applying device automatically traverses the trough over the apertured plate and, when the trough reaches the end of its travel, actuates the cylinder for moving the loading platform to the clamping position. When the loading platform reaches the clamping position it can then be made to operate the clamping cylinder and the timing device can then arrange for the clamping table to rise and the loading platform to traverse the opposite direction after the requisite clamping time.

While the cylinders have been described as being pneumatically operated, it will be appreciated that they could be hydraulically operated or replaced by electrically operated means for moving the various parts of the apparatus.

The apertured plate of the adhesive applying device is preferably made of steel, or other metal since we have found that attempts to use synthetic resin materials for the apertured plate may cause difficulties due to the accumulation of static electricity which causes the droplets of adhesive, as they pass through the apertures in the plate, to be deflected out of the true positions. This is of particular importance, since the adhesive applying device must be positioned some distance above the loading station to enable the operator to load and unload the shell mouldings, and since if the adhesive is not accurately applied the shell mouldings may be rendered valueless.

We have found that with the present apparatus the adhesive may be accurately applied and the shells may be secured together with a minimum amount of trouble.

Referring now to FIG. 6, there is shown a modification of the apparatus just described which is of particular value where a number of cores have to be inserted in the shells especially when the headroom between the loading station and the adhesive applying device is limited as it may have to be if strong air currents exist which might deflect the drops of adhesive as they fall from the adhesive applying device. Parts of the apparatus shown in FIG. 6 which are similar to like parts of the apparatus shown in FIGS. 1 to 5 have the same reference numerals, but the apparatus is essentially the same as that shown in FIGS. 1 to 5 save that three stations are provided. A first station A is provided, where the shells are loaded onto the loading platform. A second station B is located beneath the adhesive applying device and the third station C is the clamping station.

In the operation of this modification of the apparatus, an operator loads a shell onto the loading platform at station A. The loading platform is then traversed to station B where the adhesive is applied in the manner described above. After the adhesive has been applied, the loading platform is traversed back to station A where the operator can insert the cores into the shell, the movements of the operator not being impeded by the adhesive applying device which is not directly overhead as in the apparatus shown in FIGS. 1 to 5, and the operator being able to reach all parts of the shell easily. When the cores have been inserted, the operator places the other shell in position and traverses the loading platform into the clamping station C. After the requisite time, the loading platform is traversed back to station A, where the completed shell is removed, and the cycle can then recommence.

We claim:

1. Apparatus for applying adhesive to one component and subsequently clamping it to another component, comprising a main framework which is substantially L-shaped in side view, a resilient loading platform mounted so as to be movable horizontally and linearly along the framework from a loading station on the foot of the L-shaped framework to a clamping station within the framework, means for moving said loading platform, resilient clamping means mounted for vertical movement within said framework, means for moving said clamping means into engagement with two components on the loading platform when the latter is at the clamping station below said clamping means, and adhesive applying means mounted above the foot of the L-shaped framework for applying adhesive to said one component when the latter is on the loading platform, whereupon the said other component can be located on the first component and the platform and components thereon moved to the clamping station; said adhesive applying means comprising in combination an apertured plate mounted above a location for the reception of the first component on said loading platform, the apertures in the plate corresponding to positions on the first component where the adhesive is to be applied, an open-bottomed trough adapted to receive adhesive and movable over the plate so that adhesive can pass through the apertures in the plate and fall to the component therebelow, a first cross-shaft, a second cross-shaft, both said cross-shafts extending across said apertured plate parallel to the trough, a first sprocket wheel on said first cross-shaft, a rack with which said sprocket wheel engages, second sprocket wheels arranged one on each end of each cross-shaft, two racks arranged one on each side of the apertured plate for engagement by said second sprocket wheels, third sprocket wheels arranged one at each end of each cross-shaft between and adjacent to said second sprocket wheels, chains interconnecting the third sprocket wheels, means securing a part of each chain to a frame of the adhesive applying means, means securing another part of each chain to the trough, means for imparting linear motion to the axis of the first sprocket wheel thereby to move the trough, one unit of linear travel of the axis of the first sprocket wheel being converted into two units of travel of the trough and the trough being driven and guided at each end thereof.

2. The apparatus of claim 1, wherein said loading platform and clamping means each comprise a plurality of spring pins for resiliently engaging and supporting the components.

3. The apparatus of claim 2, wherein said spring pins are individually adjustable as to height.

4. The apparatus of claim 1, wherein the apertured plate is made of electrically conducting material and is earthed.

5. The apparatus of claim 4, wherein the apertured plate is made of metal.

6. The apparatus of claim 1, wherein pneumatic operable piston and cylinder arrangements are provided for moving the loading platform, the clamping means and the trough.

7. The apparatus of claim 1, wherein the trough is open-bottomed by virtue of a slot extending along the bottom thereof.

8. The apparatus of claim 1, wherein the trough is provided with means for maintaining the trough in contact with the plate.

9. The apparatus of claim 1, wherein a timing device is provided for controlling the operation of the apparatus.

10. The apparatus of claim 1, wherein the foot of the L-shaped framework defines an adhesive applying station located below said adhesive applying means and a loading station preceding the adhesive applying station, the arrangement being such that, after the loading platform has been loaded with said one component at the loading station, the loading platform is traversed to the adhesive applying station, whereupon, after the adhesive has been applied, the loading platform is retracted back to the loading station to enable an operator to locate the second component in register with the first before the two components are passed to said clamping station.

References Cited
UNITED STATES PATENTS

| | | | |
|---|---|---|---|
| 2,754,555 | 7/1956 | Young | 164—339 |
| 2,756,473 | 7/1956 | Anderson et al. | 164—339 |
| 2,899,726 | 8/1959 | Hackett | 164—339 X |
| 2,961,946 | 11/1960 | Quist | 101—123 |

CHARLES A. WILLMUTH, *Primary Examiner.*

J. P. McINTOSH, *Assistant Examiner.*